(12) United States Patent
Tokumaru (10) Patent No.: US 11,433,933 B2
(45) Date of Patent: Sep. 6, 2022

(54) GROUND BASE DEVICE, UNMANNED OPERATION SYSTEM, OPERATION SYSTEM, AND UNMANNED OPERATION METHOD

(71) Applicant: Mitsubishi Electric Corporation, Tokyo (JP)

(72) Inventor: Makoto Tokumaru, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 324 days.

(21) Appl. No.: 16/321,233

(22) PCT Filed: Aug. 4, 2016

(86) PCT No.: PCT/JP2016/072978
§ 371 (c)(1),
(2) Date: Jan. 28, 2019

(87) PCT Pub. No.: WO2018/025377
PCT Pub. Date: Feb. 8, 2018

(65) Prior Publication Data
US 2019/0168789 A1 Jun. 6, 2019

(51) Int. Cl.
*B61L 27/14* (2022.01)
*B61L 27/00* (2022.01)
(Continued)

(52) U.S. Cl.
CPC .............. *B61L 27/14* (2022.01); *B61L 15/009* (2013.01); *B61L 15/0072* (2013.01); *B61L 23/34* (2013.01); *B61L 27/00* (2013.01)

(58) Field of Classification Search
None
See application file for complete search history.

(56) References Cited

U.S. PATENT DOCUMENTS 9,849,897 B2  12/2017  Miyajima
2013/0325224 A1*  12/2013  Yamamoto ............ B61L 3/006
                                                 701/20
(Continued)

FOREIGN PATENT DOCUMENTS

DE    2033655 A    1/1971
GB    1321054 A    6/1973
(Continued)

OTHER PUBLICATIONS

Office Action (Notice of Reasons for Refusal) dated Jun. 11, 2019, by the Japan Patent Office in corresponding Japanese Patent Application No. 2018-531689 and English translation of the Office Action. (19 pages).
(Continued)

*Primary Examiner* — Peter D Nolan
*Assistant Examiner* — Michael F Whalen
(74) *Attorney, Agent, or Firm* — Buchanan Ingersoll & Rooney PC (57) ABSTRACT

A ground base device includes a schedule timetable storage unit storing a received schedule timetable periodically transmitted from the central control device; a departure-obstructed condition determination unit determining whether a departure-obstructed condition of a train is resolved and outputting departure-obstructed condition cancel signal when the departure-obstructed condition is resolved; a departure time control unit outputting departure-time appropriate signal when current time is departure time based on the schedule timetable upon receiving the departure-obstructed condition cancel signal; a departure interval control unit outputting departure-interval appropriate signal when intervals between the train and preceding and following trains are a threshold value or more upon receiving the departure-time appropriate signal; and a departure instruc-
(Continued)

tion signal output unit outputting a departure instruction signal upon receiving the departure-interval appropriate signal, and, when the central control device fails, the departure time control unit uses the schedule timetable received when the central control device is normal.

5 Claims, 7 Drawing Sheets

(51) Int. Cl.
*B61L 15/00* (2006.01)
*B61L 23/34* (2006.01)

(56) References Cited

U.S. PATENT DOCUMENTS

| | | | |
|---|---|---|---|
| 2014/0209761 A1* | 7/2014 | Kurita | B61L 25/026 246/29 R |
| 2016/0039437 A1* | 2/2016 | Miyajima | B61L 27/0077 701/19 |
| 2016/0039438 A1* | 2/2016 | Miyajima | B60L 3/102 701/19 |
| 2016/0046306 A1* | 2/2016 | Miyajima | B61L 27/0005 701/19 |
| 2016/0046307 A1 | 2/2016 | Miyajima | |

FOREIGN PATENT DOCUMENTS

| | | |
|---|---|---|
| JP | S57-015061 A | 1/1982 |
| JP | S61247564 A | 11/1986 |
| JP | H06-344916 A | 12/1994 |
| JP | 2001-001903 A | 1/2001 |
| JP | 2011-131636 A | 7/2011 |
| WO | 2014/155728 A1 | 10/2014 |

OTHER PUBLICATIONS

International Search Report (with English translation) and Written Opinion issued in corresponding International Patent Application No. PCT/JP2016/072978, dated Nov. 8, 2016, 7 pages.

Office Action dated Oct. 1, 2019, issued in corresponding Japanese Patent Application No. 2018-531689, 15 pages including 9 pages of English translation.

Office Action dated Jul. 20, 2020, by the India Patent Office in corresponding India Patent Application No. 201947001538 and English translation of the Office Action. (6 pages).

Office Action dated Feb. 4, 2021, by the German Patent Office in corresponding German Patent Application No. 112016007115.9 and English translation of the Office Action. (16 pages).

* cited by examiner

GROUND BASE DEVICE, UNMANNED OPERATION SYSTEM, OPERATION SYSTEM, AND UNMANNED OPERATION METHOD

FIELD

The present invention relates to a ground base device, an unmanned operation system, an operation system, and an unmanned operation method.

BACKGROUND

In Patent Literature 1, which is an example of conventional technologies, the departure timing of a train is controlled by inputting, to an AND circuit, a local signal output from a local control facility installed at each station and a departure-instruction negation command signal for negating the departure instruction output from a central control device installed in each area to manage an area including a plurality of stations. The operation of a train, even in a case where the central control device has failed, can be controlled from each station, which is a local side, by using, when necessary, the departure-instruction negation command signal, which is for negating a departure instruction, so as to allow the operation of the train to continue. This means that, in a case where the central control device has failed, the operation of the train is controlled from the local side.

CITATION LIST

Patent Literature

Patent Literature 1: Japanese Patent Application Laid-Open No. S61-247564

SUMMARY

Technical Problem

However, with the above conventional technology, there is a problem in that, when a departure-possible condition on the local side is satisfied, the train immediately departs and therefore the intervals between a plurality of trains cannot be adjusted.

The present invention has been made in view of the above, and an object of the present invention is to provide a ground base device capable of, when a central control device has failed, preventing a train from being delayed by adjusting the intervals between a plurality of trains.

Solution to Problem

In order to solve the above problem and achieve the object, a ground base device according to an aspect of the present invention includes: a schedule timetable storage unit to store a received schedule timetable periodically transmitted from a central control device; a departure-obstructed condition determination unit to determine whether a departure-obstructed condition of a train is resolved and output a first signal indicating that the departure-obstructed condition is resolved when the departure-obstructed condition is resolved; a departure time control unit to output, when the departure-obstructed condition cancel signal is input, a second signal indicating that a departure time is appropriate when a current time is a departure time on a basis of the schedule timetable; a departure interval control unit to output, when the departure-time appropriate signal is input, a third signal indicating that a departure interval is appropriate in a case where each of a plurality of intervals is equal to or longer than a set threshold value so as to ensure an interval between the train and a preceding train, which is one train in front of the train, and an interval between the train and a following train, which is one train behind the train; and a departure instruction signal output unit to output a departure instruction signal when the departure-interval appropriate signal is input, wherein when the central control device fails, the departure time control unit uses the schedule timetable that is received when the central control device is normal.

Advantageous Effects of Invention

According to the present invention, an effect is obtained where it is possible to obtain a ground base device capable of, when a central control device has failed, preventing a train from being delayed by adjusting the intervals between a plurality of trains.

DESCRIPTION OF EMBODIMENTS

Hereinafter, a ground base device, an unmanned operation system, an operation system, and an unmanned operation method according to embodiments of the present invention will be described in detail with reference to the drawings. The present invention is not limited to the embodiments.

First Embodiment

Figure 1:
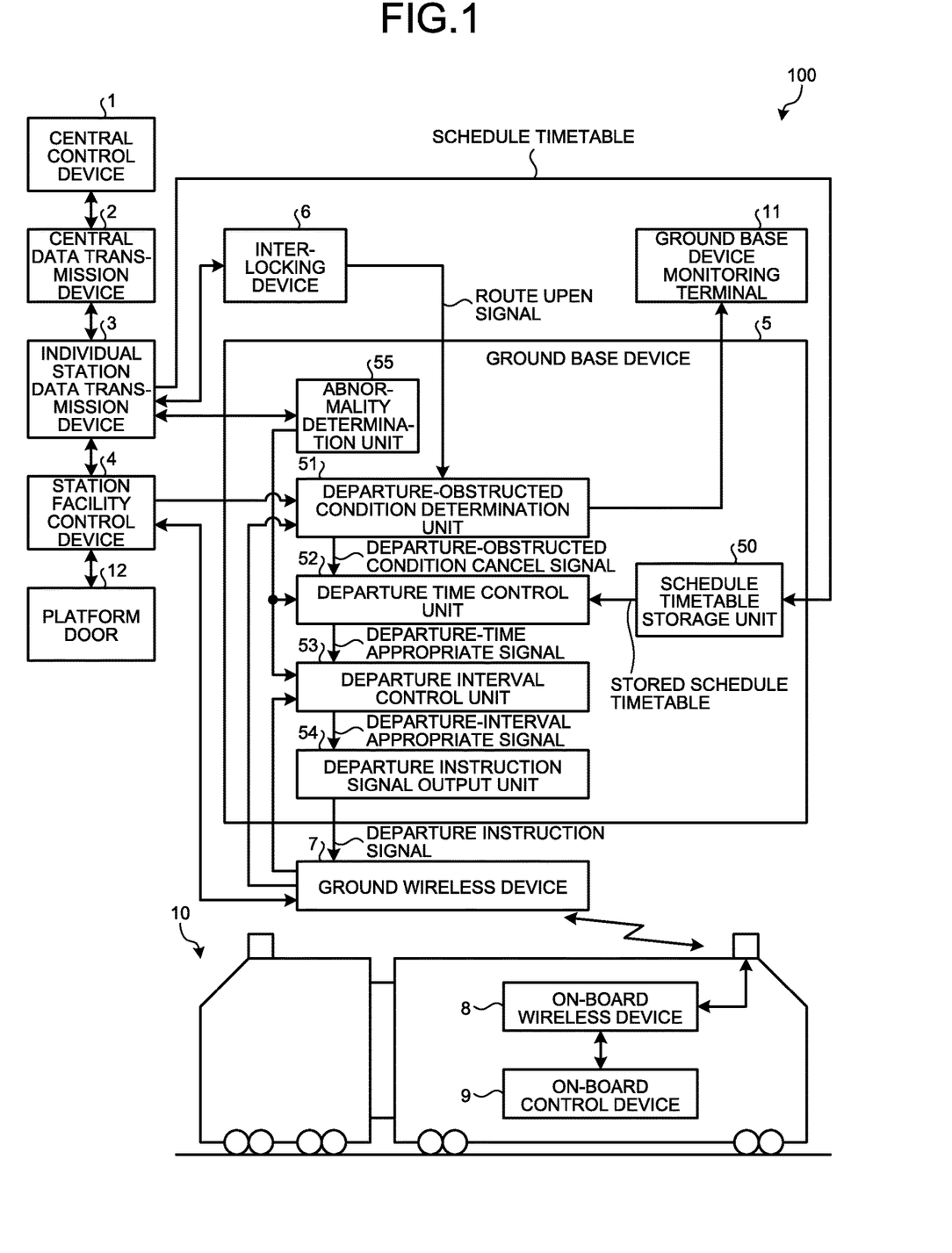
FIG. 1 is a diagram illustrating an exemplary configuration of an unmanned operation system according to a first embodiment.

FIG. 1 is a diagram illustrating an exemplary configuration of an unmanned operation system 100 according to a first embodiment of the present invention. The unmanned operation system 100 illustrated in FIG. 1 includes a central control device 1, a central data transmission device 2, an individual station data transmission device 3, a station facility control device 4, a ground base device 5, an interlocking device 6, a ground wireless device 7, an on-board wireless device 8, an on-board control device 9, a train 10, a ground base device monitoring terminal 11, and a platform door 12.

The central control device 1 is a control device that outputs a control command signal that controls the departure route and departure of the train 10 in accordance with a registered schedule. The central control device 1 has jurisdiction over an area including a plurality of stations. Under normal conditions, the central control device 1 controls the departure time of the train 10 in a way similar to a departure time control unit 52 (described later) and controls the departure interval of the train 10 in a way similar to a departure interval control unit 53. Furthermore, the central control device 1 transmits data of a given size to the ground base device 5 at regular intervals, and this allows the ground base device 5 to detect the occurrence of an abnormality in the central control device 1.

The central data transmission device 2 is a data transmission device that transmits a control command signal from the central control device 1 to the individual station data transmission device 3 and transmits state information on each station received from the individual station data transmission device 3 to the central control device 1. Here, the state information on each station includes position information on the trains in each station, speed information on the trains, and open/closed state information on the platform doors. A speed generator and a ground element that are not illustrated obtain the position of a train.

The individual station data transmission device 3 is a data transmission device that transmits control command signals to the station facility control device 4, the ground base device 5, and the interlocking device 6 in accordance with the control command signal that is transmitted from the central control device 1 and is received from the central data transmission device 2. The individual station data transmission device 3 also transmits, to the central data transmission device 2, the state information on each station received from the station facility control device 4, the ground base device 5, and the interlocking device 6.

The station facility control device 4 is a control device that transmits an open/close control signal to the platform door 12 and transmits a platform door open/closed state signal received from the platform door 12 to the individual station data transmission device 3 and the ground base device 5.

The ground base device 5 is a base device that obtains the position of a train in each station via the ground wireless device 7 and the on-board wireless device 8; calculates a stop limit for a train standing in a station on the basis of a route open signal received from the interlocking device 6; and transmits the calculated stop limit to the on-board control device 9 via the ground wireless device 7 and the on-board wireless device 8. Furthermore, the ground base device 5 receives a platform door open/closed state signal regarding the platform door 12 from the station facility control device 4 and transmits a departure prevention signal that prevents the train from departing until the platform door 12 is closed to the on-board control device 9 via the ground wireless device 7 and the on-board wireless device 8.

The ground base device 5 includes a schedule timetable storage unit 50, a departure-obstructed condition determination unit 51, the departure time control unit 52, the departure interval control unit 53, a departure instruction signal output unit 54, and an abnormality determination unit 55. The ground base device 5 outputs a departure prevention signal on the basis of the on-rail position of the train when the central control device 1 or the central data transmission device 2 fails.

The schedule timetable storage unit 50 periodically obtains a schedule timetable from the central control device 1 via the central data transmission device 2 and the individual station data transmission device 3 and stores the schedule timetable. The departure-obstructed condition determination unit 51 receives a platform door open/closed state signal and a route open signal; determines the departure-obstructed condition of the train 10; and outputs a departure-obstructed condition cancel signal, which is a first signal. The departure time control unit 52 outputs a departure-time appropriate signal, which is a second signal, to control the departure time of the train 10 in accordance with the determination result of the departure-obstructed condition determination unit 51 and the schedule timetable obtained from the schedule timetable storage unit 50. The departure interval control unit 53 outputs a departure-interval appropriate signal, which is a third signal, to control the interval between the preceding train and the train 10. The departure instruction signal output unit 54 outputs a departure instruction signal in a case where, with reference to the outputs of the departure-obstructed condition determination unit 51, the departure time control unit 52, and the departure interval control unit 53, the departure condition is satisfied. The departure instruction signal is received by the on-board control device 9 via the ground wireless device 7 and the on-board wireless device 8. The abnormality determination unit 55 checks data received from the central control device 1 via the individual station data transmission device 3 at regular intervals and determines whether the central control device 1 is normal or abnormal. When the central control device 1 is normal, the abnormality determination unit 55 transmits a departure-time checked result to the departure time control unit 52 and transmits the departure interval control determination result to the departure interval control unit 53. Note that, the regular interval can be, for example, one second to ten seconds. Furthermore, when the schedule timetable is not transmitted from the central control device 1, then data having a given size is transmitted. In a case where the data is not transmitted for a given period, for example, for a time period equivalent to three intervals or more, it is determined that the central control device 1 has an abnormality.

The interlocking device 6 is a device that is installed in an interlocking station that includes a point, a railroad signal, and a railroad switch. The interlocking device 6 receives a control command signal from the central control device 1 via the central data transmission device 2 and the individual station data transmission device 3; controls the railroad signal and the railroad switch in a state where safety is ensured on the basis of the position of the train and the states of the point, the railroad signal, and the railroad switch; and outputs a route open signal to the ground base device 5 in that state. The railroad signals include both home signals and starting signals.

The ground wireless device 7 is a wireless device that is installed on the ground side, and it communicates with the on-board wireless device 8 so as to exchange data with the ground base device 5 and the on-board control device 9. The on-board wireless device 8 is a wireless device that is installed on the vehicle side, i.e., in the train 10, and it communicates with the ground wireless device 7 so as to exchange data with the ground base device 5 and the on-board control device 9. The ground wireless device 7 receives door open/closed information on the train 10 from the on-board wireless device 8 and transmits the door open/closed information to the station facility control device 4. The station facility control device 4 that has received the door open/closed information outputs an open/close control signal to the platform door 12. This enables the opening/closing of the platform door 12 in conjunction with the opening/closing of the doors of the train 10.

The on-board control device 9 is a control device that is installed on the vehicle side, i.e., in the train 10, and it outputs the position of the train 10 to the ground base device 5 and controls travelling of the train 10 in accordance with the stop limit calculated by the ground base device 5 and the departure prevention signal. Furthermore, the train 10 is a train that includes the on-board wireless device 8 and the on-board control device 9 and is compatible with the unmanned operation system 100.

The ground base device monitoring terminal 11 is a terminal that is connected to the ground base device 5 and receives the state information on various devices and on-rail state information on the train output from the ground base device 5 when the central control device 1 has failed so that a user can monitor the on-rail state of the train and the states of the various devices.

The platform door 12 is a door installed in a part of a platform of a station facing the railroad. The platform door 12 outputs a platform door open/closed state signal to the station facility control device 4 and opens/closes in accordance with the open/close control signal received from the station facility control device 4.

Figure 2:
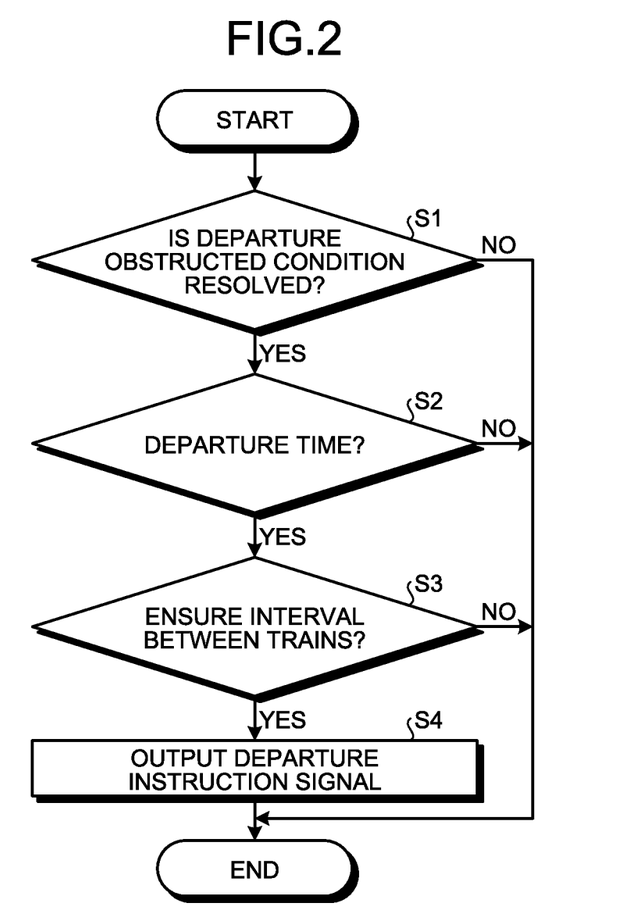
FIG. 2 is a flowchart illustrating an example operation of a ground base device according to the first embodiment.

FIG. 2 is a flowchart illustrating an example operation of the ground base device 5 according to the first embodiment of the present invention. The operation illustrated in FIG. 2 is performed at regular intervals.

First, the processing is started, and the departure-obstructed condition determination unit 51 of the ground base device 5 determines whether the departure-obstructed condition of the train 10 has been resolved (S1). In a case where the departure-obstructed condition has been resolved (S1: Yes), the departure time control unit 52 of the ground base device 5 determines whether the current time is the departure time of the train 10 (S2). When the current time is the departure time (S2: Yes), the departure interval control unit 53 of the ground base device 5 determines whether an adequate interval is ensured between the trains (S3). In other words, it is determined whether the interval between the train 10 and an immediately preceding train is equal to or more than a set threshold value. In a case where an adequate interval is ensured between the trains (S3: Yes), the departure instruction signal output unit 54 of the ground base device 5 outputs a departure instruction signal (S4) and terminates the processing. In a case where any one of the determination results in steps S1 to S3 is No, i.e., in a case where the departure-obstructed condition is not resolved (S1: No), in a case where the current time is not the departure time (S2: No), or in a case where an adequate interval is not be ensured between the trains (S3: No), the departure instruction signal output unit 54 does not output a departure instruction signal and then it terminates the processing for this interval.

In this way, only in a case where all the determination results in step S1, which is a first determination step, step S2, which is a second determination step, and step S3, which is a third determination step, are satisfied, a departure instruction signal is output and the train 10 departs. That is, the flowchart in FIG. 2 illustrates the unmanned operation method of the train 10 that departs when it receives a departure instruction signal. The following are performed: the processing in step S1, which is the first determination step for determining whether a first condition that the departure-obstructed condition of the train has been resolved is satisfied; the processing in step S2, which is the second determination step for determining whether a second condition that the current time is the departure time on the basis of the received schedule timetable periodically transmitted from the central control device 1 is satisfied; and the processing in step S3, which is the third determination step of determining whether a third condition that the interval between the train 10 and the immediately preceding train is equal to or more than the set threshold value is satisfied. After they are performed, if the first to third conditions are satisfied, then a departure instruction signal to allow the train 10 to depart is output.

Figure 3:
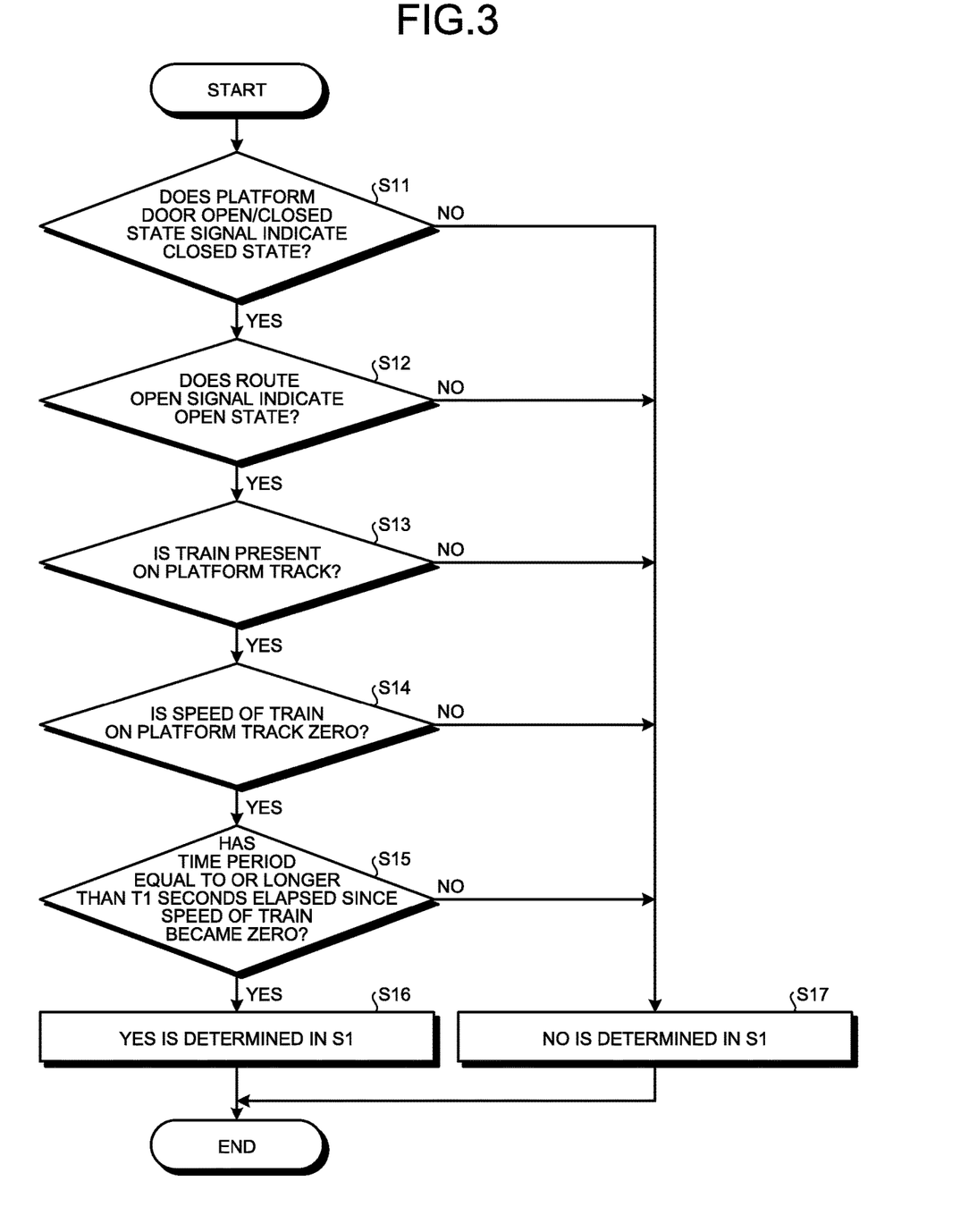
FIG. 3 is a flowchart illustrating an example operation of a departure-obstructed condition determination unit.

FIG. 3 is a flowchart illustrating an example operation of the departure-obstructed condition determination unit 51. In other words, the flowchart illustrated in FIG. 3 indicates details of the determination operation in step S1 in the flowchart illustrated in FIG. 2. First, the processing is started, and the departure-obstructed condition determination unit 51 determines whether the platform door open/closed state signal is a signal indicating a closed state (S11). In a case where the platform door open/closed state signal is a signal indicating a closed state (S11: Yes), the departure-obstructed condition determination unit 51 determines whether the route open signal is a signal indicating an open state (S12). As described above, the route open signal is output from the interlocking device 6. In a case where the route open signal is a signal indicating an open state (S12: Yes), the departure-obstructed condition determination unit 51 determines whether the train is present on a platform track at the station (S13). In a case where the train is present on the platform track (S13: Yes), the departure-obstructed condition determination unit 51 determines whether the speed of the train on the platform track is zero (S14). In a case where the speed of the train on the platform track is zero (S14: Yes), it is determined whether a time period equal to or longer than T1 seconds, which is a set time period, has elapsed since the speed of the train became zero (S15). In a case where the time period equal to or longer than the set time period T1 seconds has elapsed since the speed of the train became zero (S15: Yes), then Yes is determined in step S1 in FIG. 2 (S16), i.e., it is determined that the departure-obstructed condition has been resolved, and the processing is terminated. Note that, in a case where Yes is determined in the step S1, the departure-obstructed condition cancel signal is output. The departure-obstructed condition cancel signal is input to the departure time control unit 52. In a case where the platform door open/closed state signal is not a signal indicating a closed state (S11: No), in a case where the route open signal is not a signal indicating an open state (S12: No), in a case where the train is not present on the platform track (S13: No), in a case where the speed of the train on the platform track is not zero (S14: No), or in a case where the time period equal to or longer than the set time T1 seconds has not elapsed since the speed of the train became zero (S15: No), No is determined in step S1 (S17), i.e., it is determined that the departure-obstructed condition is not resolved, and the processing is terminated. In a case where No is determined in step S1, the processing is terminated without outputting a departure-obstructed condition cancel signal. The on-board control device 9 knows the speed of the train, and the departure-obstructed condition determination unit 51 obtains the speed of the train via the on-board wireless device 8 and the ground wireless device 7.

Figure 4:
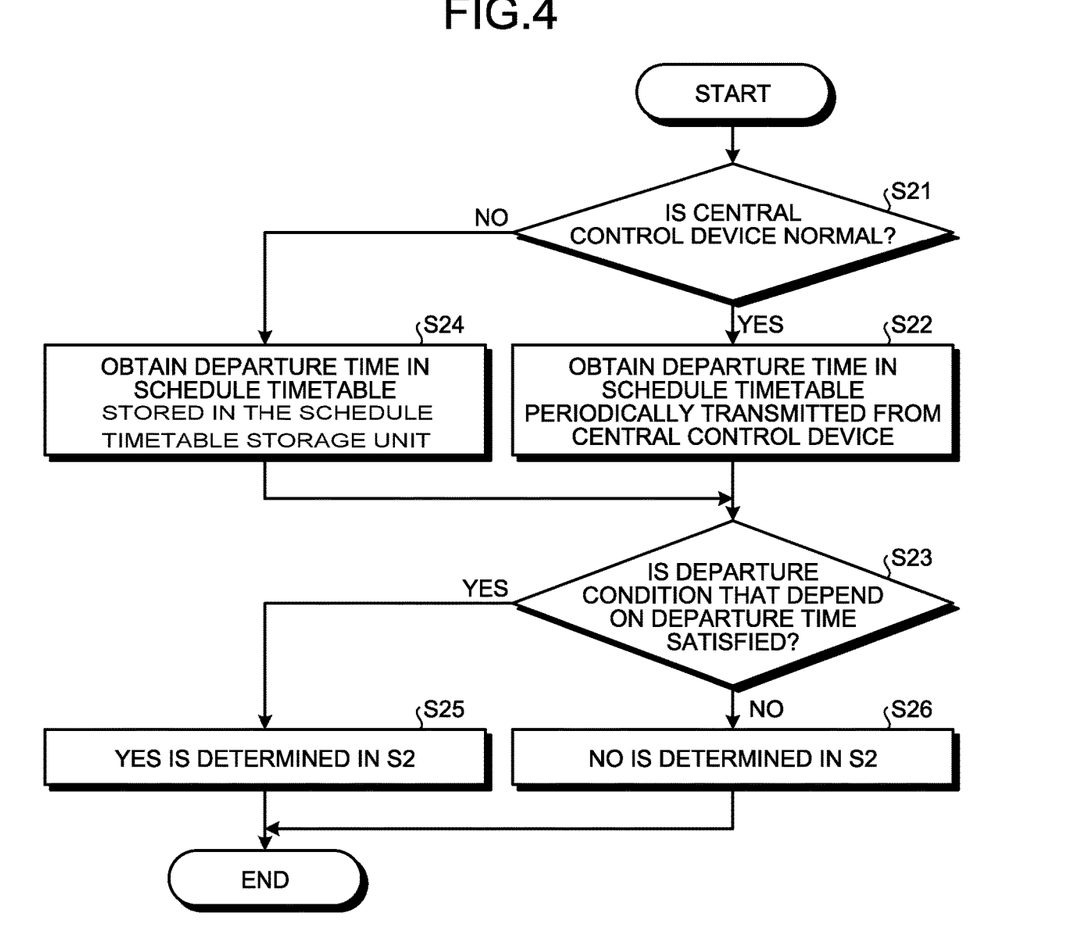
FIG. 4 is a flowchart illustrating an example operation of a departure time control unit.

FIG. 4 is a flowchart illustrating an example operation of the departure time control unit 52. In other words, the flowchart illustrated in FIG. 4 indicates details of the determination operation in step S2 in the flowchart illustrated in FIG. 2. First, the processing is started when the departure-obstructed condition cancel signal is input to the departure time control unit 52, and the departure time control unit 52 then determines whether the central control device 1 is normal (S21). Note that, here, the abnormality determination unit 55 determines whether the central control device 1 is normal and the departure time control unit 52 refers to a signal output from the abnormality determination unit 55. In a case where the central control device 1 is normal (S21: Yes), the departure time control unit 52 obtains the departure time in the schedule timetable that is periodically transmitted from the central control device 1 (S22) and determines whether the departure condition based on the departure time is satisfied (S23). In a case where the central control device 1 is not normal (S21: No), the departure time control unit 52 obtains the departure time in the schedule timetable that is periodically transmitted when the central control device 1 is normal and is stored in the schedule timetable storage unit 50 (S24). The departure time control unit 52 then determines whether the departure condition based on the departure time is satisfied (S23). In a case where the departure condition based on the departure time is satisfied (S23: Yes), Yes is determined in step S2 (S25), i.e., it is determined that the departure condition based on the departure time is satisfied, and the processing is terminated. Note that, in a case where Yes is determined in step S2, the departure-time appropriate signal is output. The departure-time appropriate signal is input to the departure interval control unit 53. In a case where the departure condition based on the departure time is not satisfied (S23: No), No is determined in step S2 (S26), i.e., it is determined that the departure condition based on the departure time is not satisfied, and the processing is terminated. Note that, in a case where No is determined in step S2, the processing is terminated without outputting a departure-time appropriate signal.

Figure 5:
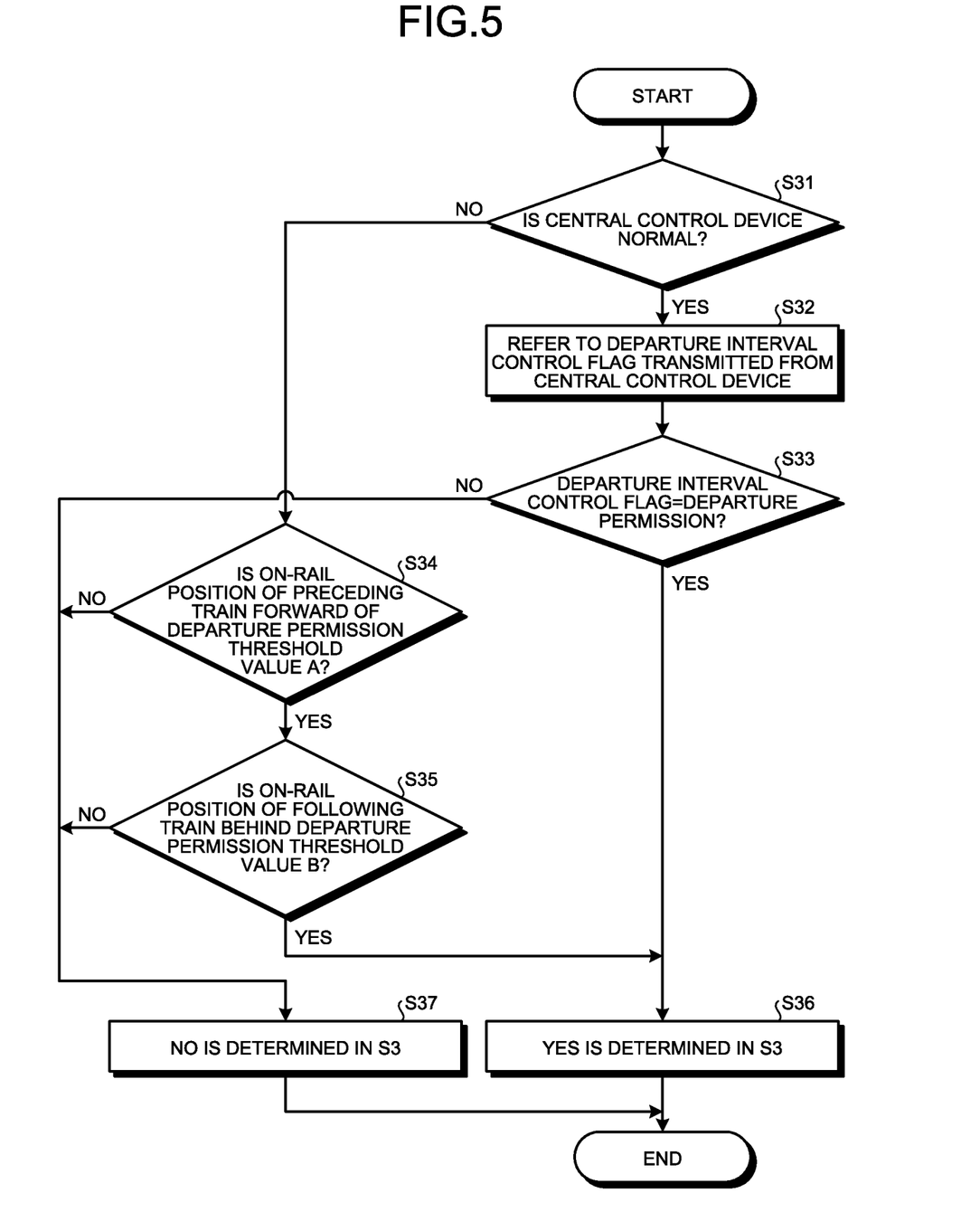
FIG. 5 is a flowchart illustrating an example operation of a departure interval control unit.

FIG. 5 is a flowchart illustrating an example operation of the departure interval control unit 53. In other words, the flowchart illustrated in FIG. 5 indicates details of the determination operation in step S3 in the flowchart illustrated in FIG. 2. First, the processing is started when the departure-time appropriate signal is input to the departure interval control unit 53, and the departure interval control unit 53 then determines whether the central control device 1 is normal (S31). Note that, here, the abnormality determination unit 55 determines whether the central control device 1 is normal and the departure time control unit 52 refers to a signal output from the abnormality determination unit 55. Here, in a case where the central control device 1 is normal (S31: Yes), the departure interval control unit 53 obtains a departure interval control flag that is periodically transmitted from the central control device 1 (S32) and determines whether the departure interval control flag indicates departure permission (S33). In a case where the central control device 1 is not normal (S31: No), the departure interval control unit 53 determines whether the on-rail position of the preceding train is in front of a departure permission threshold value A (S34). Here, the departure permission threshold value A is a value that is preset on the basis of the interval to be ensured between the train 10 and the preceding train. In a case where the on-rail position of the preceding train is in front of the departure permission threshold value A (S34: Yes), the departure interval control unit 53 determines whether the on-rail position of the following train is behind a departure permission threshold value B (S35). Here, the departure permission threshold value B is a value that is preset on the basis of the interval to be ensured between the train 10 and the following train. If the on-rail position of the following train is behind the departure permission threshold value B (S35: Yes), Yes is determined in step S3 (S36), i.e., it is determined that an adequate interval is ensured between the trains, and the processing is terminated. In a case where the on-rail position of the preceding train is not in front of the departure permission threshold value A (S34: No) or in a case where the on-rail position of the following train is not behind the departure permission threshold value B (S35: No), No is determined in step S3 (S37), i.e., it is determined that an adequate interval is not ensured between the trains, and the processing is terminated. Note that, in a case where Yes is determined in step S3, the departure interval control unit 53 outputs a departure-interval appropriate signal, and in a case where No is determined in step S3, the departure interval control unit 53 terminates the processing without outputting a departure-interval appropriate signal. The departure-interval appropriate signal is input to the departure instruction signal output unit 54. The departure interval control unit 53 obtains, via the on-board wireless device 8 and the ground wireless device 7, the position information on the train that the on-board control device 9 knows and it then determines the interval between the trains by using the position information.

As described with reference to FIG. 5, when the departure of the train is delayed in consideration of the interval between the train and the following train, the operation interval between the train and the following train is appropriately maintained. If the operation interval between the train and the following train is appropriately maintained in this way, in a case where there are many passengers, such as during the rush hour, the passenger density in the following train is reduced and the time needed for boarding and deboarding the following train can be shortened. Thus, the dwell time at the station can be shortened, and any delay of a group of trains including the following train can be recovered.

Figure 6:
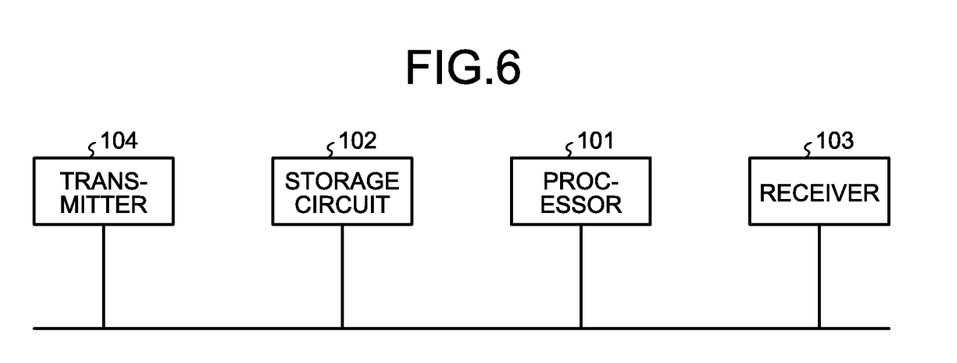
FIG. 6 is a diagram illustrating an example of a general configuration of hardware for realizing the ground base device of the unmanned operation system according to the first embodiment.

Note that, in the present embodiment described above, the ground base device 5 includes at least a processor, a storage circuit, a receiver, and a transmitter, and the operations of each device can be realized by software. FIG. 6 is a diagram illustrating an example of a general configuration of hardware for realizing the ground base device 5 of the unmanned operation system according to the present embodiment. The device illustrated in FIG. 6 includes a processor 101, a storage circuit 102, a receiver 103, and a transmitter 104. The processor 101 performs calculation and control with software by using received data, and the storage circuit 102 stores software as well as the received data or data required when the processor 101 performs calculation and control. The receiver 103 is an interface that receives a signal or information input to the ground base device 5. The transmitter 104 is an interface that transmits a signal or information input to the ground base device 5. Note that the number of each of the processors 101, storage circuits 102, receivers 103, and transmitters 104 may be more than one.

As described in the present embodiment, even if a control command signal from the central control device 1 is not received, the ground base device 5 can output a departure instruction signal. Thus, it is possible to obtain an unmanned operation system that can prevent the delay of a train by adjusting the intervals between a plurality of trains when the central control device fails.

Second Embodiment

Figure 7:
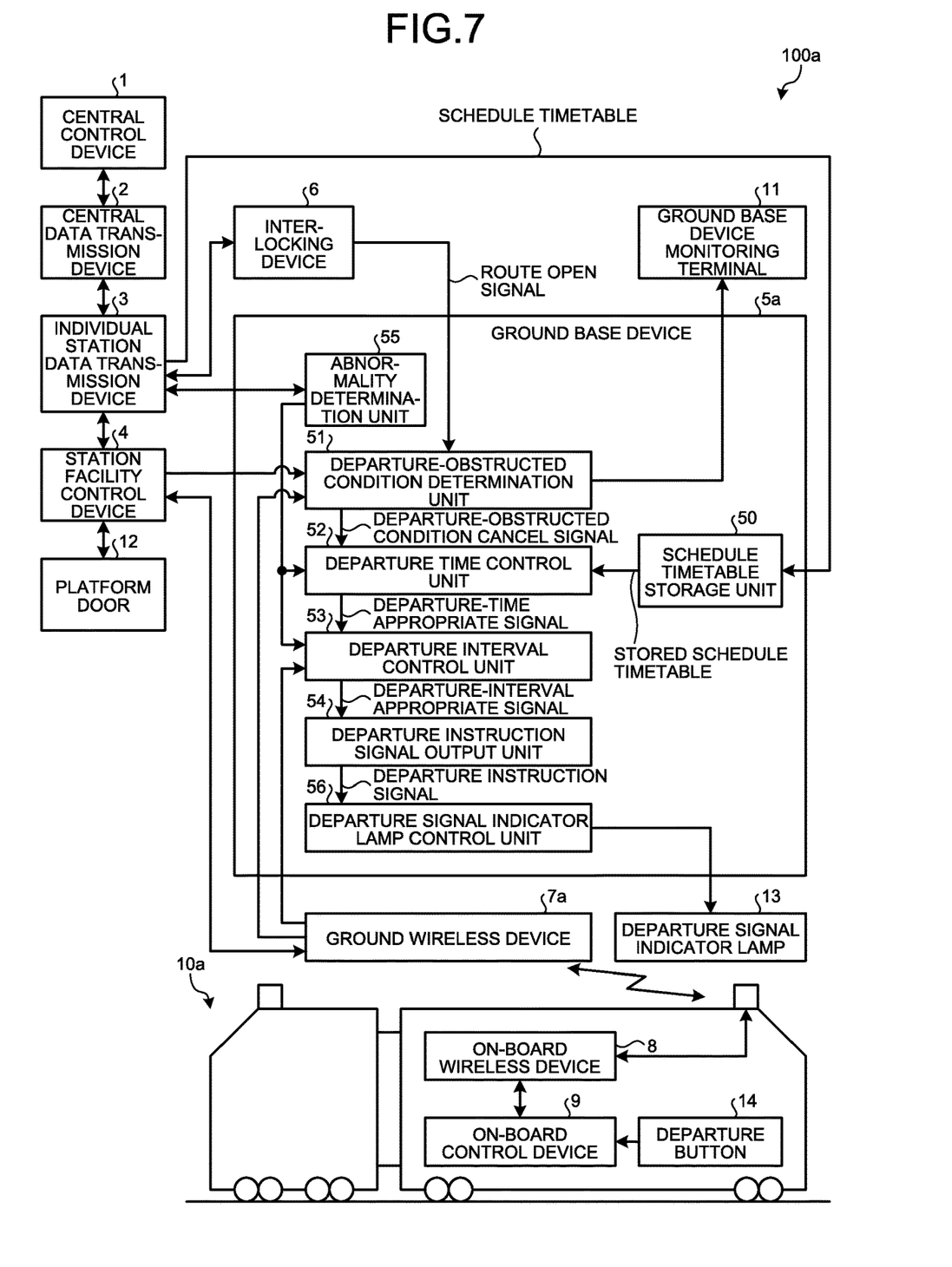
FIG. 7 is a diagram illustrating an exemplary configuration of an operation system according to a second embodiment.

FIG. 7 is a diagram illustrating an exemplary configuration of an operation system according to a second embodiment of the present invention. An operation system 100*a* illustrated in FIG. 7 is different from the unmanned operation system illustrated in FIG. 1 in that a ground base device 5*a* is provided instead of the ground base device 5, a ground wireless device 7a is provided instead of the ground wireless device 7, a train 10a is provided instead of the train 10, and a departure signal indicator lamp 13 is provided on the ground side. Other components are similar to those of the unmanned operation system illustrated in FIG. 1. The ground base device 5a includes a departure-signal indicator lamp control unit 56 that receives the output of the departure instruction signal output unit 54, and the departure-signal indicator lamp control unit 56 controls whether to output a control signal to the departure signal indicator lamp 13 provided on the ground side to light the departure signal indicator lamp 13. The output of the departure instruction signal output unit 54 is not input to the ground wireless device 7a. The train 10a includes a departure button 14 for outputting a departure signal to the on-board control device 9 at the operator's seat.

In the operation system illustrated in FIG. 7, the train 10a departs by the departure button 14 at the operator's seat being pressed by an operator. When the departure signal indicator lamp 13 is lit up, the operator presses the departure button 14 and thus the operation can be performed even in a case where the central control device 1 has failed in a similar manner to the configuration described in the first embodiment.

In FIG. 7, the departure signal indicator lamp 13 is provided on the ground side. However, the present invention is not limited to this, and the departure signal indicator lamp 13 may be provided in the train 10a. Alternatively, instead of the departure signal indicator lamp 13, a departure signal may be displayed on a display in the operator's cab of the train 10a.

As described in the present embodiment, the present invention can be used with a train when it is operating unmanned and, in addition, with a train under one-man operation.

The configurations indicated in the above embodiments indicate examples of the present invention and can be combined with other known techniques. Furthermore, the configurations indicated in the embodiments can be partially omitted and changed without departing from the scope of the present invention.

REFERENCE SIGNS LIST 1 central control device; 2 central data transmission device; 3 individual station data transmission device; 4 station facility control device; 5, 5a ground base device; 6 interlocking device; 7, 7a ground wireless device; 8 on-board wireless device; 9 on-board control device; 10, 10a train; 11 ground base device monitoring terminal; 12 platform door; 13 departure signal indicator lamp; 14 departure button; 50 schedule timetable storage unit; 51 departure-obstructed condition determination unit; 52 departure time control unit; 53 departure interval control unit; 54 departure instruction signal output unit; 55 abnormality determination unit; 56 departure-signal indicator lamp control unit; 100 unmanned operation system; 100a operation system; 101 processor; 102 storage circuit; 103 receiver; 104 transmitter.

The invention claimed is:

1. A ground base device comprising:
a schedule timetable storage to store a received schedule timetable periodically transmitted from a central control device;
a departure-obstructed condition determiner to determine whether a departure-obstructed condition of a train is resolved and output a first signal indicating that the departure-obstructed condition is resolved when the departure-obstructed condition is resolved;
a departure time controller to output, when the first signal is input, a second signal indicating that a departure time is appropriate when a current time is a departure time on a basis of the schedule timetable;
a departure interval controller to output, when the second signal is input, a third signal indicating that a departure interval is appropriate in a case where each of a plurality of intervals is equal to or longer than a set threshold value so as to ensure an interval between the train and a preceding train, which is one train in front of the train, and an interval between the train and a following train, which is one train behind the train;
a departure instruction signal transmitter to output a departure instruction signal when the third signal is input; and
an abnormality determiner that determines that the central control device is abnormal based on a failure to receive a message having a predefined size by the ground base device from the central control device for a predetermined time period, wherein
in response to the abnormality determiner determination that the central control device is abnormal, the departure time controller uses the schedule timetable that was received when the central control device was normal.

2. An unmanned operation system comprising:
the ground base device according to claim 1; and
the central control device configured to periodically transmit the schedule timetable, wherein
the train departs when the departure instruction signal is received.

3. An operation system comprising:
the ground base device according to claim 1;
the central control device configured to periodically transmit the schedule timetable; and
a departure signal indicator lamp, wherein
when the departure instruction signal is input to the departure signal indicator lamp, the departure signal indicator lamp lights up.

4. An operation system comprising:
the ground base device according to claim 1; and
the central control device configured to periodically transmit the schedule timetable, wherein
when the departure instruction signal is input to the train, a departure signal is displayed in an operator's cab in the train.

5. An unmanned operation method of a train that departs when a departure instruction signal is received from a ground base device, the method comprising:
determining whether a first condition that a departure-obstructed condition of the train is resolved is satisfied;
determining whether a second condition that a current time is a departure time on a basis of a received schedule timetable that is periodically transmitted from a central control device is satisfied;
determining whether a third condition that an interval between the train and a preceding train, which is one train in front of the train, is equal to or more than a set threshold value is satisfied;
outputting a departure instruction signal for allowing the train to depart in a case where the first to third conditions are satisfied; and
determining that the central control device is abnormal based on a failure to receive a message having a predefined size by the ground base device from the central control device for a predetermined time period, wherein in response to determining that the central control device is abnormal, the schedule timetable received when the central control device was normal is used.

* * * * *